Oct. 13, 1964 J. A. VASSELLI 3,152,437
CYCLE INDICATOR
Filed March 26, 1963 2 Sheets-Sheet 1

Inventor
JOSEPH A. VASSELLI
By Borst & Borst
Attorneys

Oct. 13, 1964    J. A. VASSELLI    3,152,437
CYCLE INDICATOR
Filed March 26, 1963    2 Sheets-Sheet 2
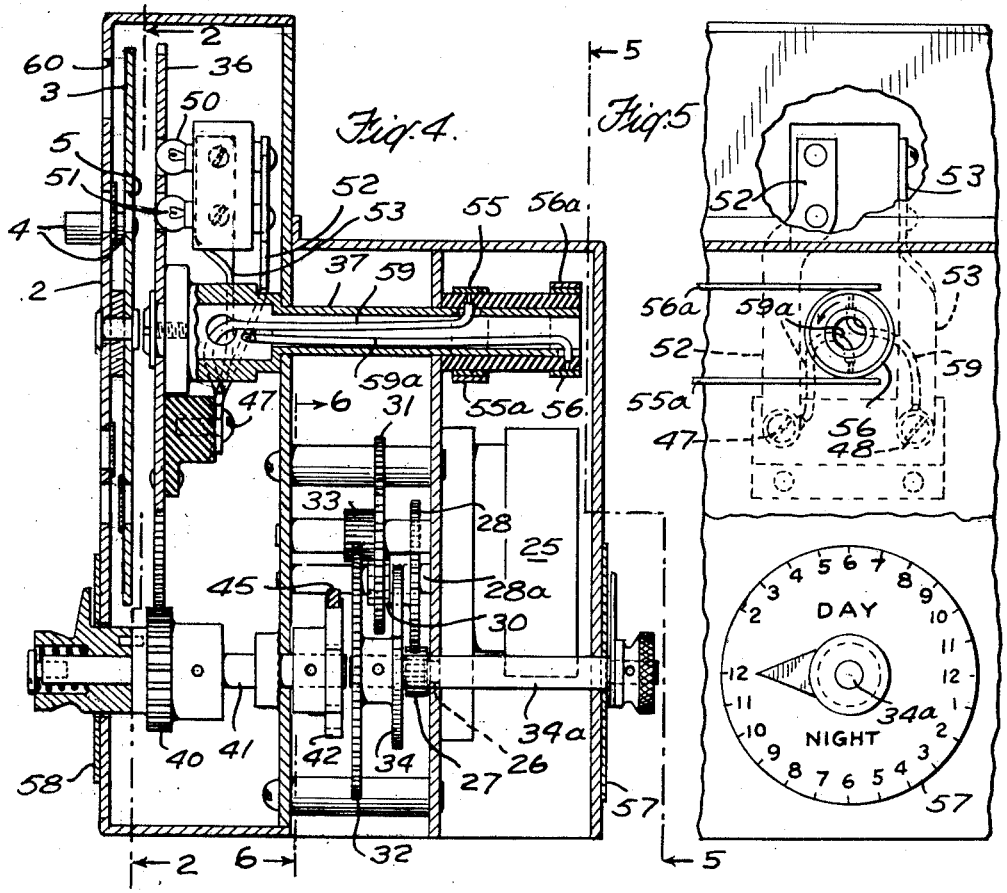
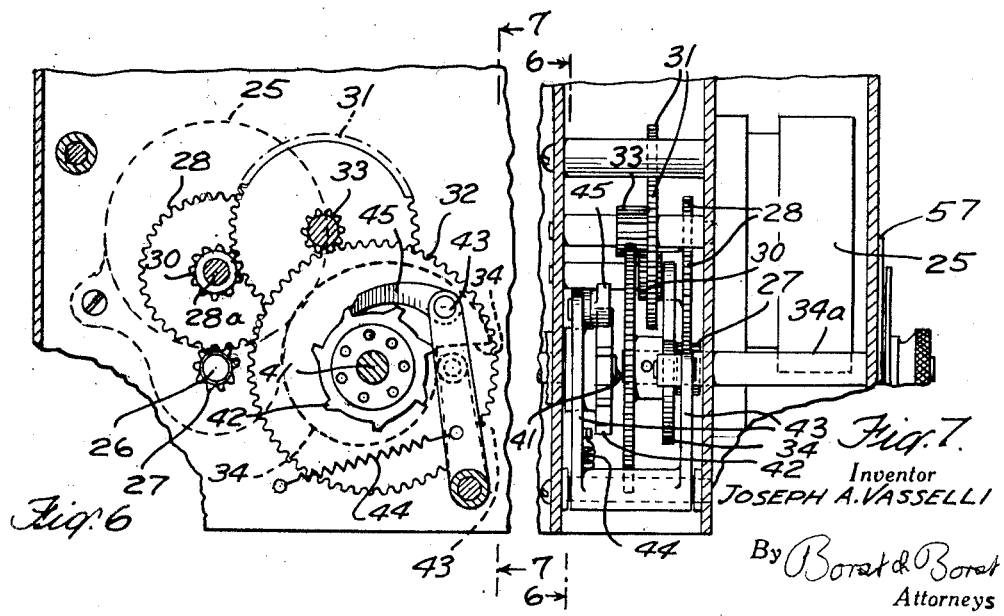
Inventor
JOSEPH A. VASSELLI
By Borak & Borak
Attorneys

3,152,437
CYCLE INDICATOR
Joseph A. Vasselli, 66 Knowlton Road, Allendale, N.J.
Filed Mar. 26, 1963, Ser. No. 268,104
5 Claims. (Cl. 58—4)

This invention relates to indicators and particularly to indicators which are driven at a constant rate and yield information which is modulated by time.

According to the invention there is provided a dial device having superposed on its indicating components information relative to a woman's menstrual cycle and, in addition, information relating the cycle to the sterile and fertile periods thereof. The device is seen to have essential utility and application with respect to the subject of the rhythm method of family planning which has sectarian endorsement as the only natural method. According to this method, the fertile period in a woman's cycle occurs fourteen days from the beginning of the next cycle which means that the length of the initial sterile period in the cycle occurring immediately prior to the fertile period is governed essentially by the length of the cycle itself. The length of cycle differs among women and may vary from twenty-one days to as much as thirty-five days. The present device must, therefore, provide indicating components which may be adjusted for various expected cycle durations, an adjustment which must necessarily be accompanied by a corresponding adjustment of the duration of the initial sterile period. The time scale for these components is in diurnal units, the periods of menstruation and potential fertility being assumed constant for all women. The passage of time is marked by the indicator relative to the adjusted positions of the indicating components and is visually indicated by a light mounted in juxtaposition to the components and arranged to move as a function of time. While in operation the user of the indicator can know instantly the period of her cycle which is in effect, determination of whether she is still in her initial sterile period, her potentially fertile period or her second sterile period which is of fixed duration and occurs immediately prior to the beginning of the next cycle.

One object of the invention is to provide an indicator which is especially arranged to yield automatically and instantaneously information relative to a woman's cycle.

Another object of the invention is to provide a distaff cycle indicator which yields pertinent information concerning sterility and fertility for cycles of various expected durations.

Other objects and advantages of the invention may be appreciated on reading the following detailed description of the indicator which is taken in conjunction with the accompanying drawings, in which FIG. 1 is a front elevation of the indicator;

FIG. 4 is an enlarged view in vertical section of the indicator taken on line 4—4 of FIG. 1;

FIG. 5 is a broken elevational view of the indicator taken on line 5—5 of FIG. 4;

FIG. 6 is a view in partial section taken on the line 6—6 of FIG. 7, and

FIG. 7 is a section taken on the line 7—7 of FIG. 6.

Figure 1:
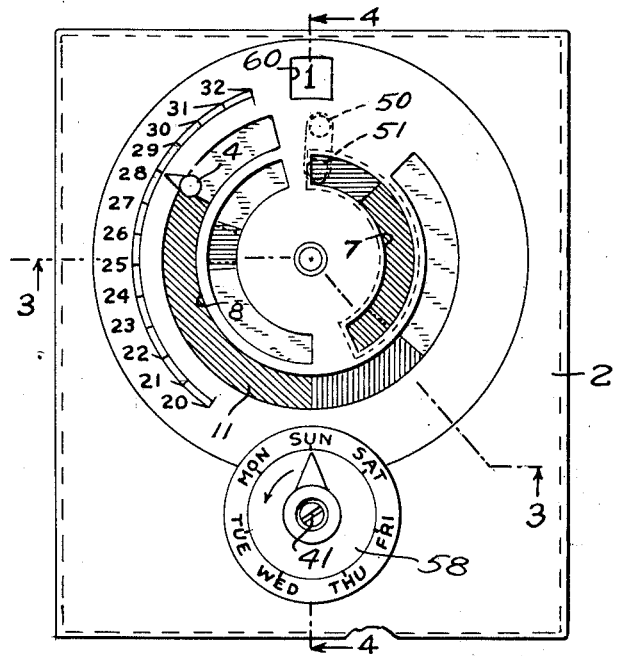
Figure 2:
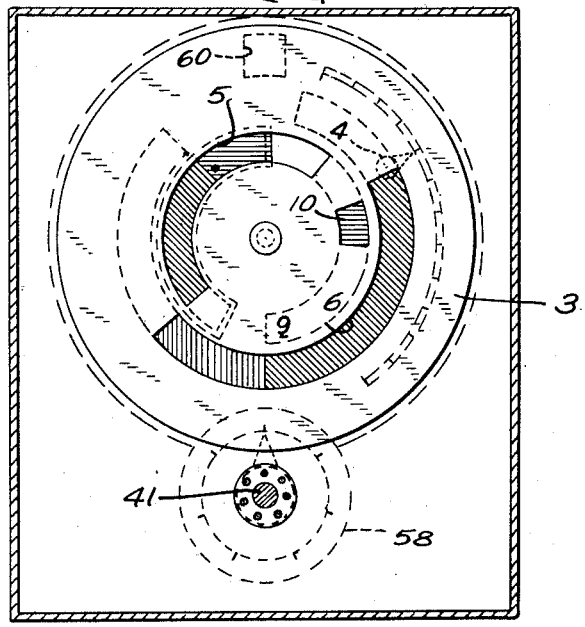
FIG. 2 shows in section the reverse side of the indicator dial of the apparatus taken on line 2—2 of FIG. 4 on a reduced scale.
Figure 3:
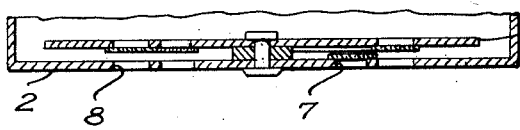
FIG. 3 is a sectional side view of the indicator dial taken on line 3—3 of FIG. 1.

Referring to FIG. 1 the indicator 1 has superposed on its outer face 2 numerical indicia from 20 to 32 representing the number of days of cycle duration which women variously experience. Selection of her expected cycle or in some cases her averaged cycle is made by rotation of a concentrically mounted indicator plate 3 until the pointer 4 is opposite the desired number. The adjustable indicator plate 3 is formed with an inner semi-annular window 5, and an outer semi-annular window 6, the two windows being nearly complementary. The outer face 2 of the indicator is the fixed indicating component and is provided with an inner window 7 which is nearly semi-annular and of the same radius of curvature as the window 5 formed in the adjustable plate 3 and a window 8 which is nearly annular and of the same radius of curvature as the outer window 6 in the adjustable plate 3. The unslotted section of the plate 3 having this radius constitutes a mask 9 to partially conceal the inner window 7 depending on its adjusted position. In the window 7 of the outer face is secured a blue filter indicating a fixed menstrual duration followed by a green filter indicating a sterile period of a duration dependent on the setting of the plate 3. There is disposed in the outer window 6 a red filter indicating a potentially fertile period followed by a green filter indicating the second sterile period in the cycle. The beginning of the mask 9 of the plate 3 and of the red filter in its outer window do, of course, fall on the same radial line as they must since the end of the first sterile period is always immediately attended by the onset of a fertile period. While fertility exists fourteen days from the beginning of the next cycle, the red filter indicating fertility has sufficient arcuate length to represent a four or five day period of potential fertility which is followed thereafter by the second green filter representing the ten or eleven days of sterile period subsequent to fertility.

The changes occurring throughout the cycle are visually marked by a light source mounted to move in rotation behind the filtered windows in first the outer face of the indicator dial and then in the adjustable plate 3. The mechanism for causing the light source to rotate in this manner in relation to the filtered sections of the indicator dials so as to afford instant indication of the contemporaneous stage in a woman's cycle will now be described.

Referring to FIG. 4, the motor 25 has an output shaft 26 on which a wide tooth pinion 27 is mounted. A gear 28 on shaft 28a is in engagement with the gear 27 and there is also mounted on the shaft 28a a pinion 30 in engagement with a 72 tooth gear 31. A 96 tooth gear 32 is driven by the gear 31 through an intermediate hub gear 33 and there is mounted on the shaft of the gear 32 a knock-off cam 34 which is driven in rotation by cam shaft 34a. A lamp plate 36 mounted on hollow shaft 37 is intermittently driven through its 105 teeth as the result of the latter being in gear engagement with a gear 40 mounted on ratchet gear shaft 41. A 7 tooth ratchet gear 42 is mounted on the shaft 41 and is actuated by the cam 34 through a spring biased U-shaped arm 43 pivotally mounted below the cam and having on one arm a roller follower which is pressed by the spring 44 to the operative surface of the knock-off cam 34. Attached to the second arm of the arm 43 is a pawl 45 in continuous engagement with the ratchet gear 42 and adapted to rotate the ratchet gear one tooth in counter clockwise roation as viewed in FIG. 6 when the arm 43 is suddenly dropped from the peak of the knock-off cam 34 under the urging of the spring 44.

A pair of terminals 47 and 48 connects an electrical source to a pair of parallel connected lamps 50 and 51 which are supported by the lamp plate 36. The lamps are suitably provided with sockets in a block carried by the lamp plate 36. Apertures in the plate permit the lamps to illuminate the filtered windows in the plate 3 and in the outer face 2 of the indicator. The terminals 47 and 48 are connected to the lamps by a pair of conductors 52 and 53 which in turn are connected by wires 59 and 59a disposed within the hollow shaft 37 to contact collectors 55 and 56. The collectors are mounted on the shaft 37 to turn therewith and engage source energizing brushes 55a and 56a, respectively.

An hour dial 57 is also mounted on the cam shaft 34a and is positioned relative to the knock-off cam 34 so that the end of the 24 hour cycle will correspond to the drop point on the knock-off cam. Mounted on the ratchet gear shaft 41 is a removable day dial 58 which can be set to the appropriate day of the week when the operation of the indicator is started. Both the hour dial 57 and the day of the week dial 58 offer to the user a check on the operation of the indicator. In addition, a window 60 is provided in the outer face of the indicator and numbers indicating the number of days since the beginning of the cycle are circumferentially disposed on the face of the lamp plate 36 for viewing through the window. By turning the plate until the number appears appropriate to her stage in the cycle, she can start operation of the indicator at any time.

Various modifications in the embodiment of invention above described may be effected by one skilled in the art without departing from the scope and principle of invention as defined in the appended claims.

What is claimed is:

1. An indicator comprising a pair of indicia bearing components, one of said components being fixed and the other of said components being relatively adjustable with respect to said fixed component and adapted to conceal the indicia on said fixed component to an extent dependent on its adjusted position, a light source mounted proximate to said components and means for causing said source to illumine the unconcealed indicia borne on said components progressively and at a constant rate.

2. An indicator comprising a fixed component having annularly arranged indicia, a rotatably adjustable component concentrically mounted over said fixed component and having annularly arranged indicia and a circular mask section adapted to conceal partially the indicia on said fixed component according to its adjusted position, a rotatable plate supporting a lamp in illuminative position relative to the indicia on said components, a constant rate motor, a gear train connecting the output of said motor to said rotatable plate.

3. An indicator comprising a fixed component having annularly arranged indicia, a rotatably adjustable component concentrically mounted over said fixed component and having annularly arranged indicia and a circular mask section adapted to conceal partially the indicia on said fixed component according to its adjusted position, a shaft, a plate mounted on said shaft and supporting a lamp in illuminative position relative to the indicia on said components, a ratchet gear mounted on a second shaft, a motor, a cam shaft driven by said motor, a knock-off cam mounted on said cam shaft, a spring biased arm and pawl mechanism pivotally mounted proximate said cam and arranged to bear on the operative surface of said cam and operatively to engage said ratchet gear under the control of said cam.

4. An indicator comprising a fixed component having annularly arranged indicia, a rotatably adjustable component concentrically mounted over said fixed component and having annularly arranged indicia and a circular mask section adapted to conceal partially the indicia on said fixed component according to its adjusted position, a shaft, a plate mounted on said shaft and supporting a lamp in illuminative position relative to the indicia on said components, a ratchet gear mounted on a second shaft, a motor, a cam shaft driven by said motor, a knock-off cam mounted on said cam shaft, a spring biased arm and pawl mechanism pivotally mounted proximate said cam and arranged to bear on the operative surface of said cam and operatively to engage said ratchet gear under the control of said cam, an hour dial visibly mounted on said cam shaft and discretely positioned in accordance with the mounted position of said cam with the knock-off position thereof and the hourly terminal position of said dial angularly coinciding.

5. An indicator comprising a fixed component having annularly arranged indicia, a rotatably adjustable component concentrically mounted over said fixed component and having annularly arranged indicia and a circular mask section adapted to conceal partially the indicia on said fixed component according to its adjusted position, a shaft, a plate mounted on said shaft and supporting a lamp in illuminative position relative to the indicia on said components, a ratchet gear shaft, a ratchet gear mounted on said ratchet gear shaft, a motor, a cam shaft driven by said motor, a knock-off cam mounted on said cam shaft, a spring biased arm and pawl mechanism pivotally mounted proximate said cam and arranged to bear on the operative surface of said cam and operatively to engage said ratchet gear under the control of said cam, an hour dial visibly mounted on said cam shaft and discretely positioned in accordance with the mounted position of said cam with the knock-off position thereof and the hourly terminal position of said dial angularly coinciding and a day dial removably mounted on said ratchet gear shaft, said dial serving as a safety check on the operation of said indicator.

References Cited in the file of this patent

UNITED STATES PATENTS 225,888 Stewart _____ Mar. 23, 1880

FOREIGN PATENTS 49,250 Denmark _____ Sept. 10, 1934